(12) United States Patent
Bo et al.

(10) Patent No.: US 6,265,845 B1
(45) Date of Patent: Jul. 24, 2001

(54) PORTABLE BATTERY CHARGER HAVING A SEPARATE BATTERY PACK

(75) Inventors: Sang-Moo Hwang Bo, Taegu-Kwangyokshi; Dong-Wook Gwak, Kyongsangbuk-do; Ju-Ho Song, Kyongsangbuk-do; Jeong-Woo Seo, Kyongsangbuk-do; Hae-Wan Choi, Kyongsangbuk-do, all of (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/578,318

(22) Filed: May 25, 2000

(30) Foreign Application Priority Data

May 28, 1999 (KR) .................................................. 99-19446

(51) Int. Cl.$^7$ ................................................ H01M 10/46
(52) U.S. Cl. .............................................................. 320/113
(58) Field of Search ..................... 320/106, 110, 320/112, 113, 114, 115; D13/104, 107; 429/96, 100, 170

(56) References Cited

U.S. PATENT DOCUMENTS

| | | | |
|---|---|---|---|
| 5,229,701 | * | 7/1993 | Léman et al. ........................ 320/115 |
| 5,280,229 | * | 1/1994 | Faude et al. ......................... 320/110 |
| 5,656,914 | | 8/1997 | Nagele et al. . |
| 5,659,236 | * | 8/1997 | Hahn ................................ 320/115 X |
| 6,049,192 | * | 4/2000 | Kfoury et al. .................... 320/115 X |

* cited by examiner

Primary Examiner—Edward H. Tso
(74) Attorney, Agent, or Firm—Dilworth & Barrese, LLP (57) ABSTRACT

A portable battery charger having at least one charging pocket for recharging a battery pack mounted on a mobile station or a separate battery pack, comprising a charger housing including a pair of inside walls facing each other, a ceiling connecting the inside walls, at least one opening side, a mounting space enclosed by the inside walls and the ceiling, and a printed circuit board providing at least one pair of electrical contacts; a charging unit having front and rear surfaces, a pair of side surfaces, and at least one top surface detachably mounted in the mounting housing for independently recharging the mobile station while traveling; a guide structure for horizontally or vertically mounting the charging unit in the charger housing; and an electrical connection device for electrically connecting the charging unit with the charger housing.

20 Claims, 13 Drawing Sheets

PORTABLE BATTERY CHARGER HAVING A SEPARATE BATTERY PACK

BACKGROUND OF THE INVENTION

1. Field of the Invention

The present invention relates to a battery charger for recharging a battery pack mounted on a mobile station or a separate battery pack.

2. Description of the Related Art

Generally, a battery charger for a mobile station is used to recharge a battery pack mounted on a mobile station, including a housing having charging pockets for holding a mobile station attached with a battery pack or separate battery pack and electrical contacts formed in the charging pockets for connecting the battery pack to a power supply. For example, U.S. Pat. No. 5,656,914 granted to Albert L. Nagele discloses a battery charger having two charging pockets, one of which is used for recharging a battery pack mounted on a mobile station, and the other for separate large and small battery packs.

However, such battery chargers cannot accommodate battery packs of different forms and designs from those fit for them. This causes the user to obtain a new battery charger designed to fit each newly bought mobile station of a different model. Further, as the life cycle of the mobile station tends to be shortened, various battery chargers are required to accommodate different models of the mobile station. Besides, a traveler's battery charger has been developed in order to enable a traveler to readily recharge the battery mounted on the mobile station during the journey. Hence, the user, if necessary, must buy two kinds of battery chargers, namely, a desktop battery charger usually used in his home and a traveler's battery charger.

SUMMARY OF THE INVENTION

It is an object of the present invention to provide a portable battery charger for accommodating varieties of battery packs and various mobile stations attached with such battery packs.

It is another object of the present invention to provide a traveler's battery charging unit for readily recharging a battery pack mounted on a mobile station during a journey.

It is still another object of the present invention to provide a battery charging unit compatibly used for various electronic instruments such as mobile station, notebook computer, electric shaver, etc.

According to an aspect of the present invention, a portable battery charger having at least one charging pocket for recharging a battery pack mounted on a mobile station or a separate battery pack, comprises: a charger housing including a pair of inside walls facing each other, a ceiling connecting the inside walls, at least one opening side, a mounting space enclosed by the inside walls and ceiling, and a printed circuit board providing at least a pair of electrical contacts; a charging unit having front and rear surfaces, a pair of side surfaces, and at least a top surface detachably mounted in the mounting housing for independently recharging the mobile station while traveling; a guide structure for mounting the charging unit in the charger housing in a vertical fashion, a horizontal fashion, or at any angle between the horizontal and vertical; and an electrical connection device for electrically connecting the charging unit with the charger housing.

The present invention will now be described more specifically with reference to the drawings attached only by way of example.

DETAILED DESCRIPTION OF THE PREFERRED EMBODIMENT

Throughout the attached drawings and the detailed description the same reference numbers are used to represent the same functional parts, and detailed descriptions concerning conventional parts are omitted as they would unduly cloud the present invention.

Figure 1:
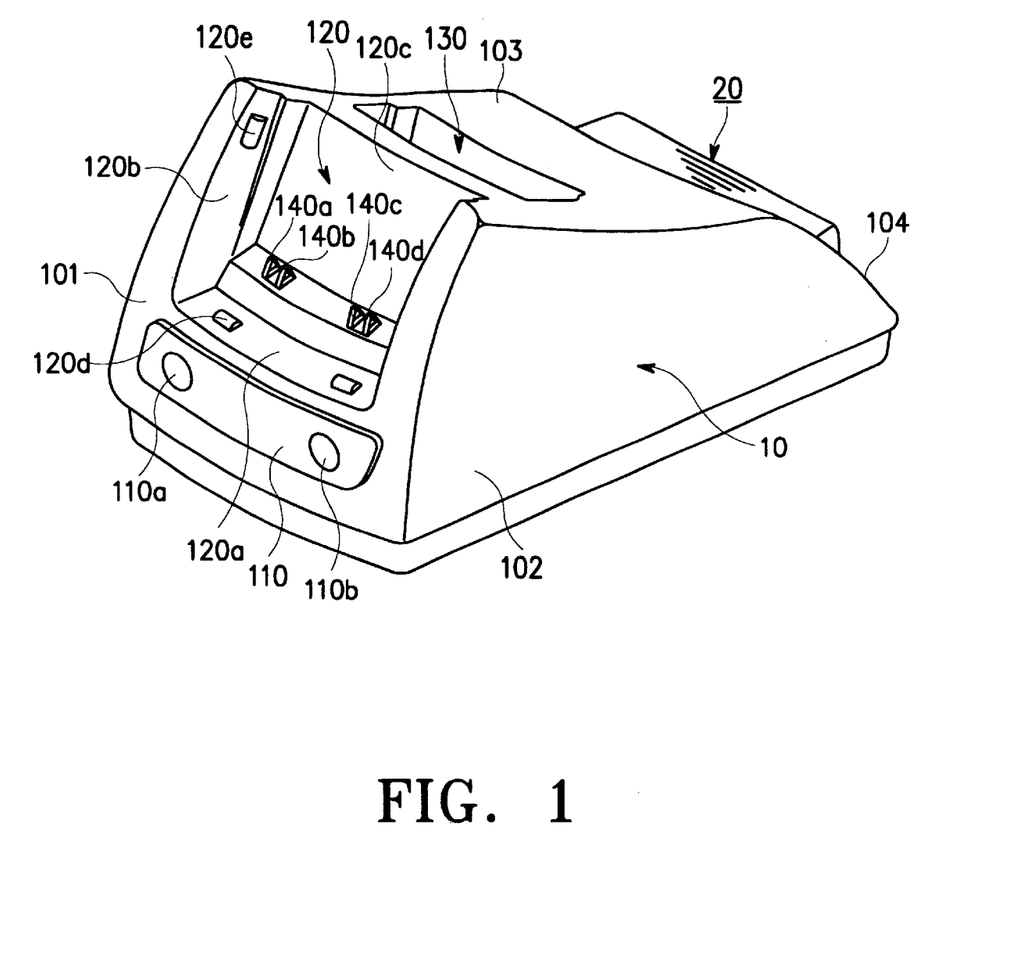
FIG. 1 is a perspective view for illustrating a portable battery charger according to an embodiment of the present.

Referring to FIG. 1, shown is a portable battery charger to recharge a battery pack mounted on a mobile station and a separate battery pack according to a first embodiment of the present invention. It essentially consists of a charger housing 10 and a charging unit 20 mounted in the charger housing 10. The charging unit 20 may be separately used for charging a battery pack mounted on a mobile station by using an additional electrical connection device during a journey. The charger housing 10 includes two charging pockets or receptacles 120 and 130 to hold either or both the mobile station with a battery pack attached and/or a separate battery pack. The charger housing 10 includes a front part 101, a pair of side parts 102, an upper part 103, and a rear part 104. The front part 101 is provided with a lower transparent window 110, above which is arranged a first charging pocket 120. Behind the first charging pocket is arranged a second charging pocket 130.

The first charging pocket 120 includes a bottom 120*a*, a pair of side walls 120*b*, and a rear wall 120*c*. The first charging pocket 120 may receive a mobile station attached with a battery pack or a separate battery pack. The bottom 120*a* includes at least a first protuberance 120*d*. Likewise, the side wall 120*b* includes at least a second protuberance 120*e*. The first protuberances are arranged symmetrically. The second protuberances 120*e* are arranged to face each other. Additionally provided between the bottom 120*a* and the pair of side walls 120*b* are a plurality of electrical contacts 140*a* to 140*d* positioned to mate with corresponding electrical contacts of the battery pack. The electrical contacts 140*a* to 140*d* respectively represent charging contact, data contact, battery history contact, and thermistor contact, symmetrically arranged and accommodating to various batteries of different mobile station models. Mounting the charging unit 20 in the charger housing 10, the transparent window 110 enables the user to see two charging indication lights provided in the charging unit 10 to indicate the charging state of the battery. One charging indication light 110*a* may represent the charging state of the battery pack mounted on the mobile station, and the other 110*b* of the separate battery pack. The second charging pocket 130 is to charge a separate large or small battery pack, likewise provided with first and second protuberances and electrical contacts as in the first charging pocket 120.

Figure 2:
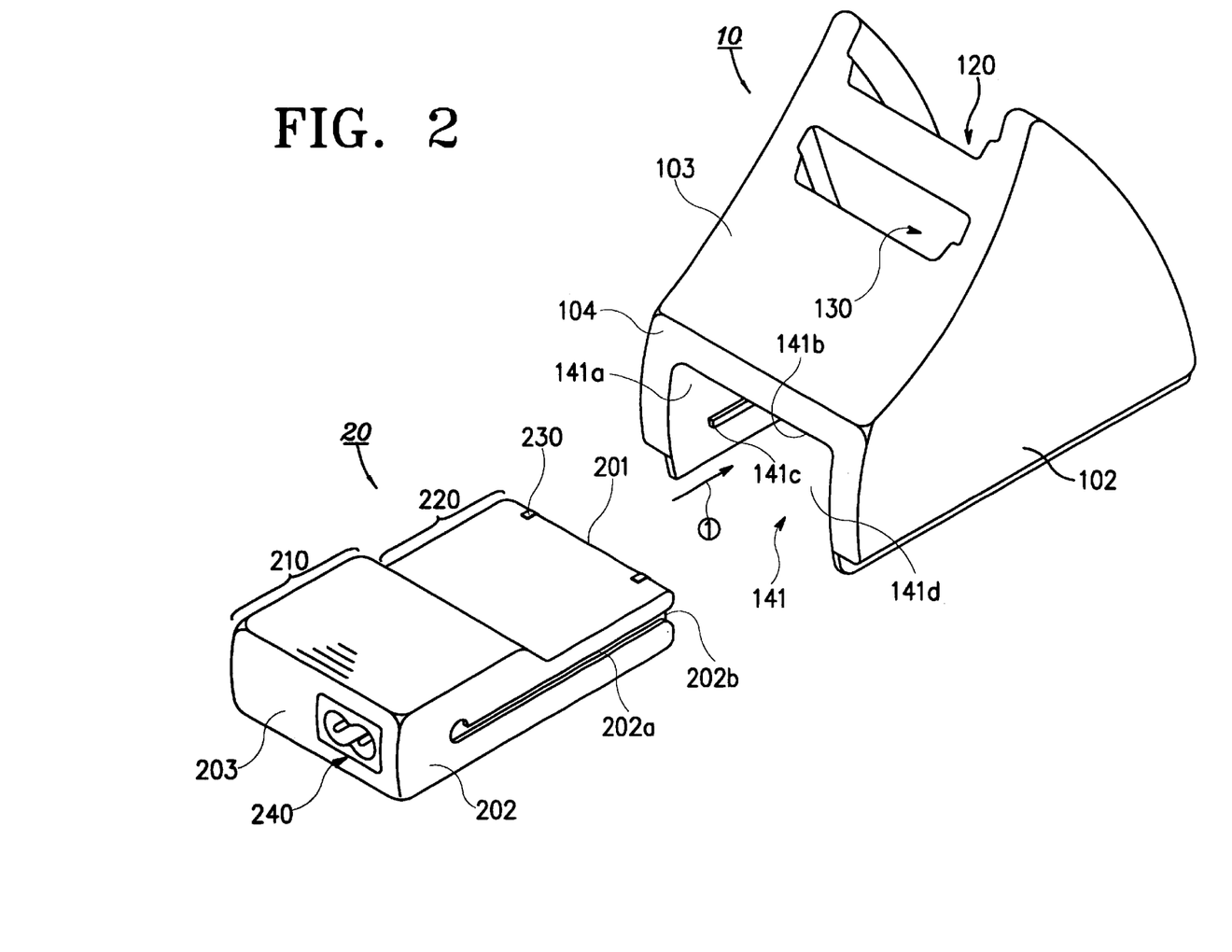
FIG. 2 is an exploded and perspective view for illustrating the portable battery charger of FIG. 1.
Figure 3:
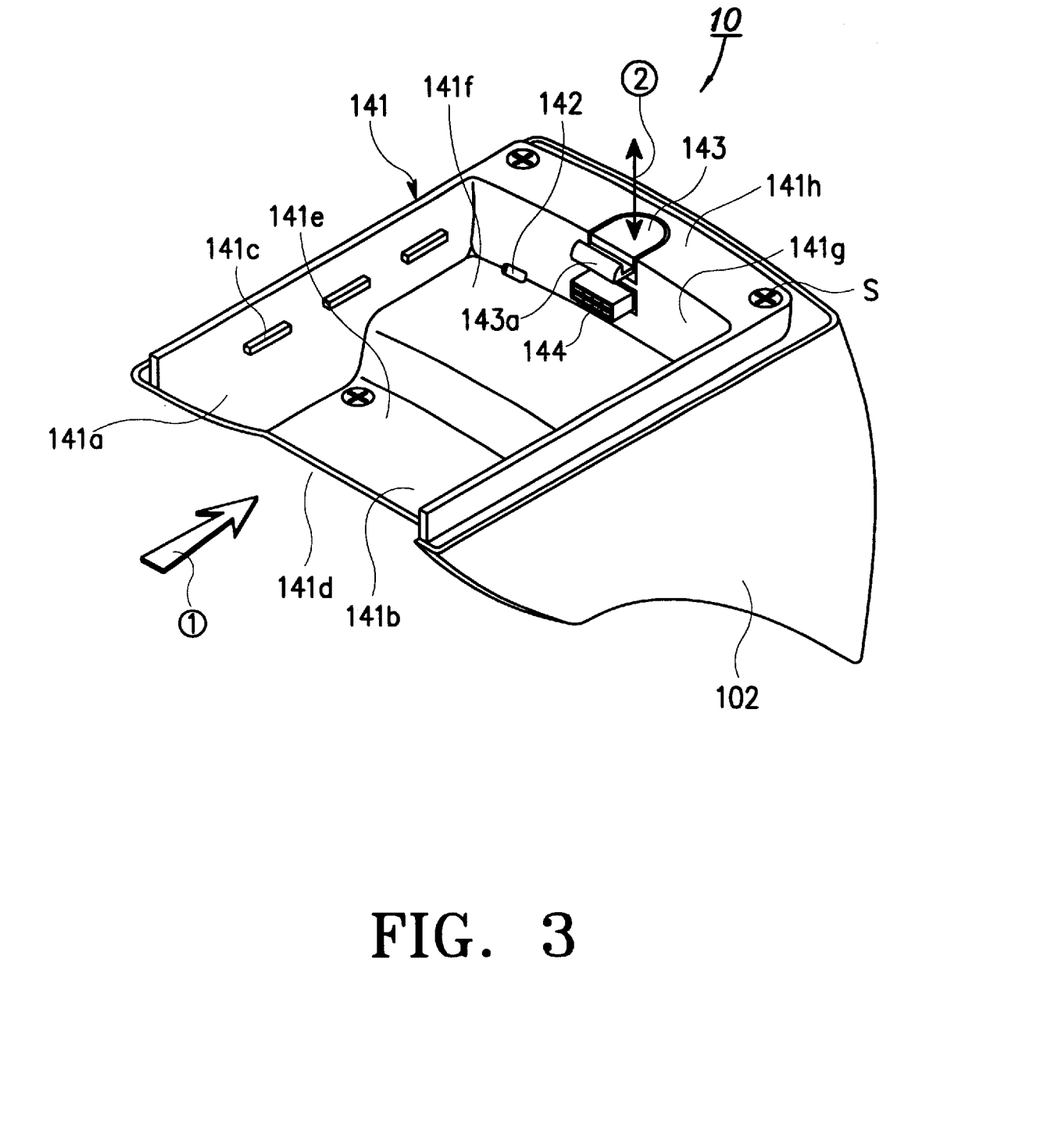
FIG. 3 is a perspective view for illustrating the lower part of the portable battery charger of FIG. 1.
Figure 4:
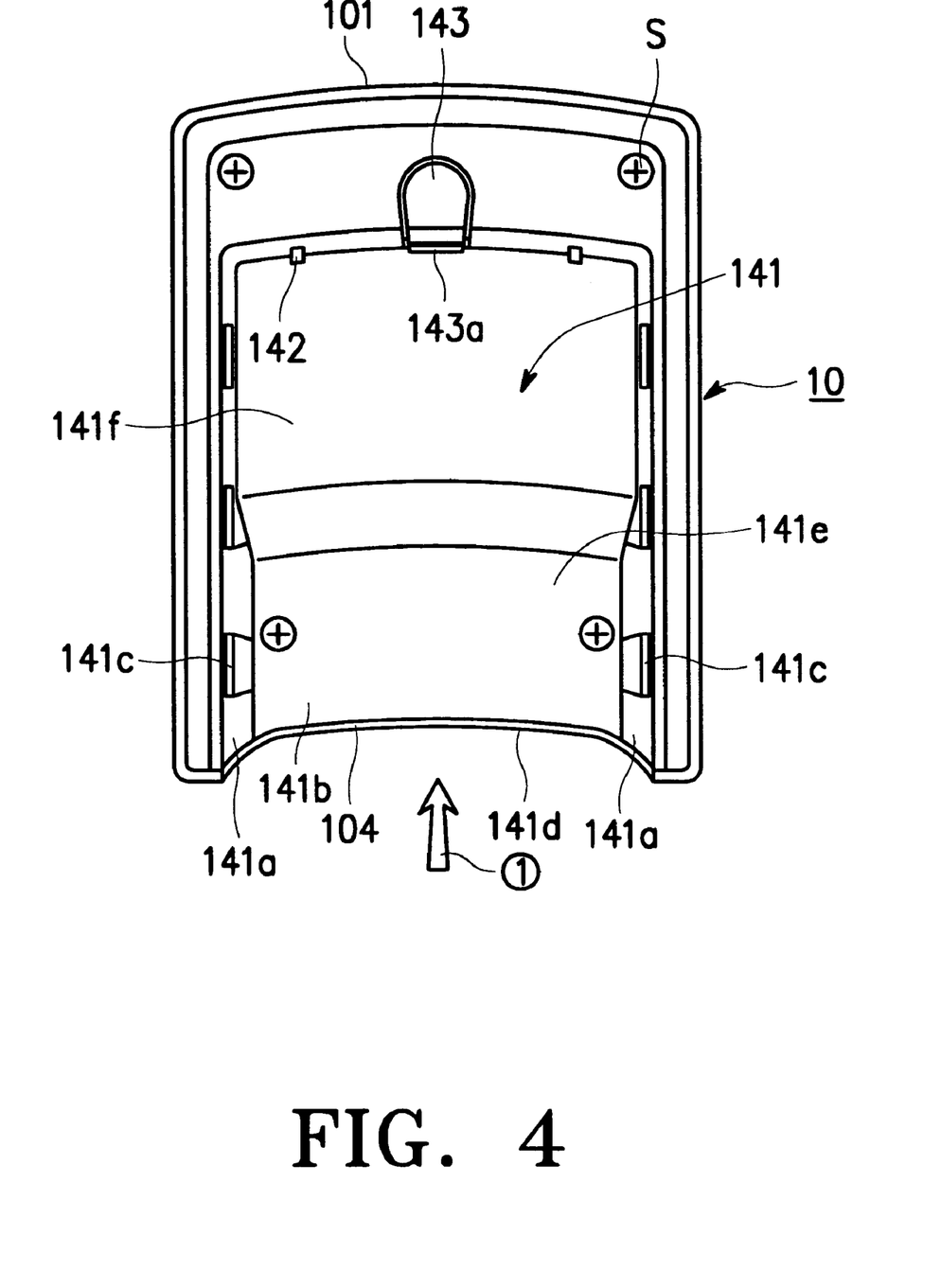
FIG. 4 is a plane view of FIG. 3.

Referring to FIG. 2, the charger housing 10 has a mounting space 141 provided in the lower part to receive the charging unit 20 in the horizontal direction of arrow ①. The mounting space 141 is enclosed by a pair of inside walls 141*a* and a ceiling 141*b*. Additionally provided is a guide structure for horizontally mounting the charging unit 20 into the charger housing 10, which consists of a pair of horizontal guide grooves 202*a* respectively formed in both side surfaces 202 of the charging unit 20, and at least one vertical guide rib 141*c* symmetrically formed on each of the inside walls 141*a* of the charger housing 10 so designed to be inserted in the corresponding horizontal guide groove 202*a*. The rear end of the charger housing 104 has an opening 141*d* to receive the charging unit 10. The mounting space 141, as shown in FIGS. 3 and 4, is divided into two sub-spaces 141*e* and 141*f*, and is so designed that one sub-space 141*e* is larger than the other sub-space 141*f*, in order to accommodate the outline of the charging unit 20 (see FIGS. 2 and 5).

The closed rear end 141*g* of the charger housing 10 has a locker 143 provided in a plane surface 141*h* so as to lock the charging unit 20 into the charger housing 10. The locker 143 has a hook 143*a* at its free end. The charging unit 20 mounted in the charger housing 10 may be detached by pressing the locker in the direction of arrow ②. As is well known in this art, the locker 143 may be designed to work under the resiliency of a spring. Under the locker 143 of the charger housing 10 is provided an electrical connector 144 projected from the closed rear end 141*g*, which mates with a corresponding electrical connector provided in the charging unit 20 to connect with the printed circuit board provided in the charger housing 10.

Meanwhile, the charger housing 10 is provided with at least one aperture 142 to transmit the lights of the light emitting diodes arranged in the charging unit 20 to the transparent window. Although two apertures 142 are shown in the present embodiment, more than two apertures 142 may be provided to correspond with more than two light emitting diodes provided in the charging unit.

The mounting space 141 of the charger housing 10 is divided into a first sub-space 141*e* with a higher ceiling part and a second sub-space 141*f* with a lower ceiling part so as to form a step in the ceiling 141*b*. Likewise, the charging unit 20 is shaped to have a thick part 210 and a thin part 220 to correspond with the outline of the ceiling 141*b*, as shown in FIGS. 2 and 5, so that the charging unit 20 may be smoothly fit into the mounting space 141 of the charger housing 10 without excessive impact.

Figure 5:
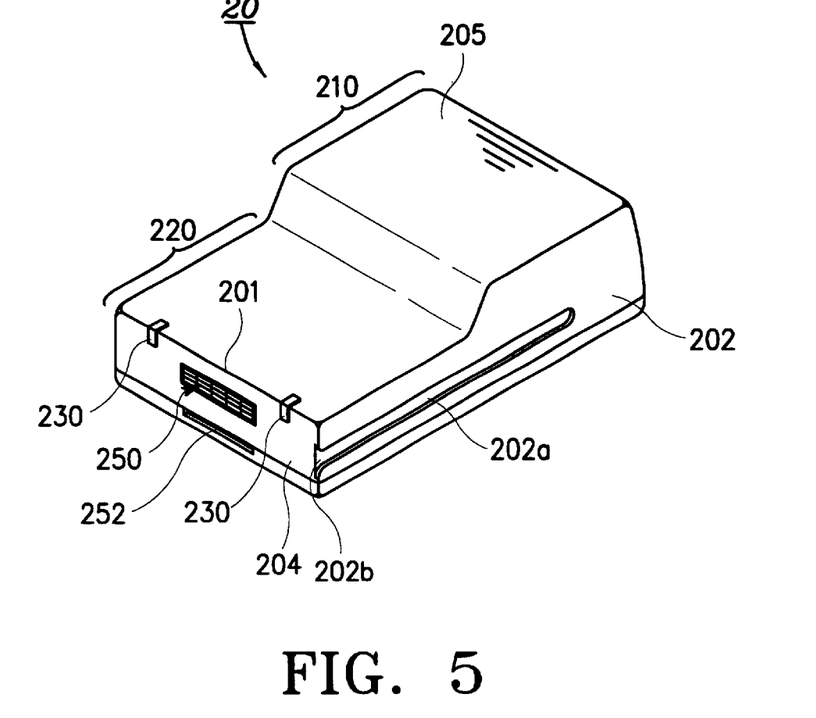
FIG. 5 is a perspective view for illustrating a charging unit of the portable battery charger of FIG. 1.

As shown in FIGS. 2 and 5, the charging unit 20 has a front surface 204, a rear surface 203, a pair of side surfaces 202, a top surface 205, and a leading edge 201 between the front surface 204 and top surface 205. The leading edge 201 has the light emitting diodes 230 symmetrically arranged, the rear surface 203 having an electrical connector 240, and the front surface 204 having an interface connector 250. Also provided below the interface connector 250 is a locker slot 252 to receive the hook 143*a* of the locker 143.

Figure 13A:
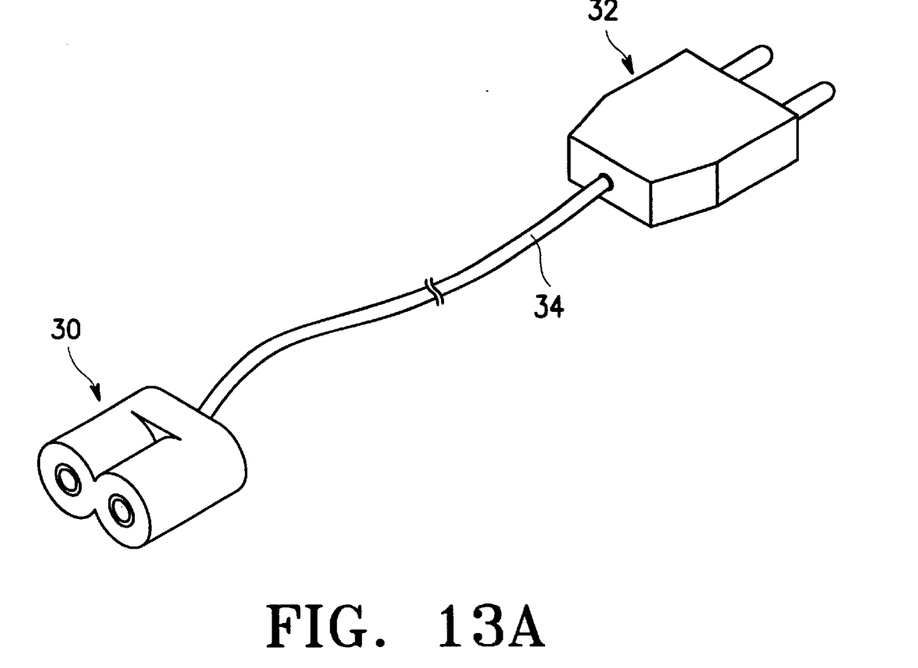
FIGS. 13A and 13B are perspective views illustrating electrical connection devices according to the present invention.

The charging unit 20 is connected through its connection port 240 with an electrical connection device as shown in FIG. 13A to a power supply provided in a wall to supply power to the battery pack mounted in the charger housing 10. Of course, the charging unit 20 may be independently and readily used to supply power to various electronic devices such as electric shaver, notebook computer, mobile station, etc. while traveling.

Figure 6:
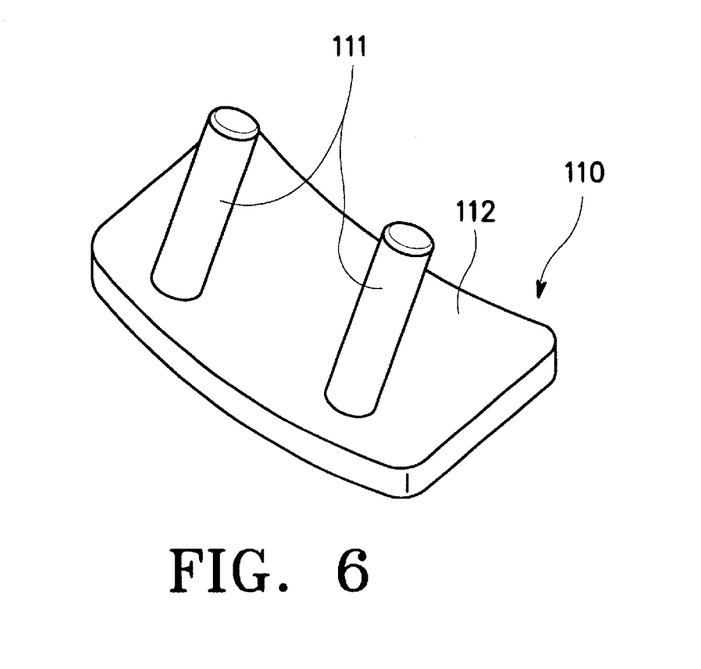
FIG. 6 is a perspective view of a transparent window and lenses arranged on the front end of the portable battery charger of FIG. 1.

Referring to FIG. 6, the charger housing 10 has a transparent window 110 mounted on its front end to include at least a lens 111 slantingly extended from the surface 112, so that the light of the light emitting diodes 230 of the charging unit 20 mounted in the charger housing 10 are passed through the lens 111 to the transparent window 110. Two or more lenses 111 may be attached to the transparent window 110.

Figure 7:
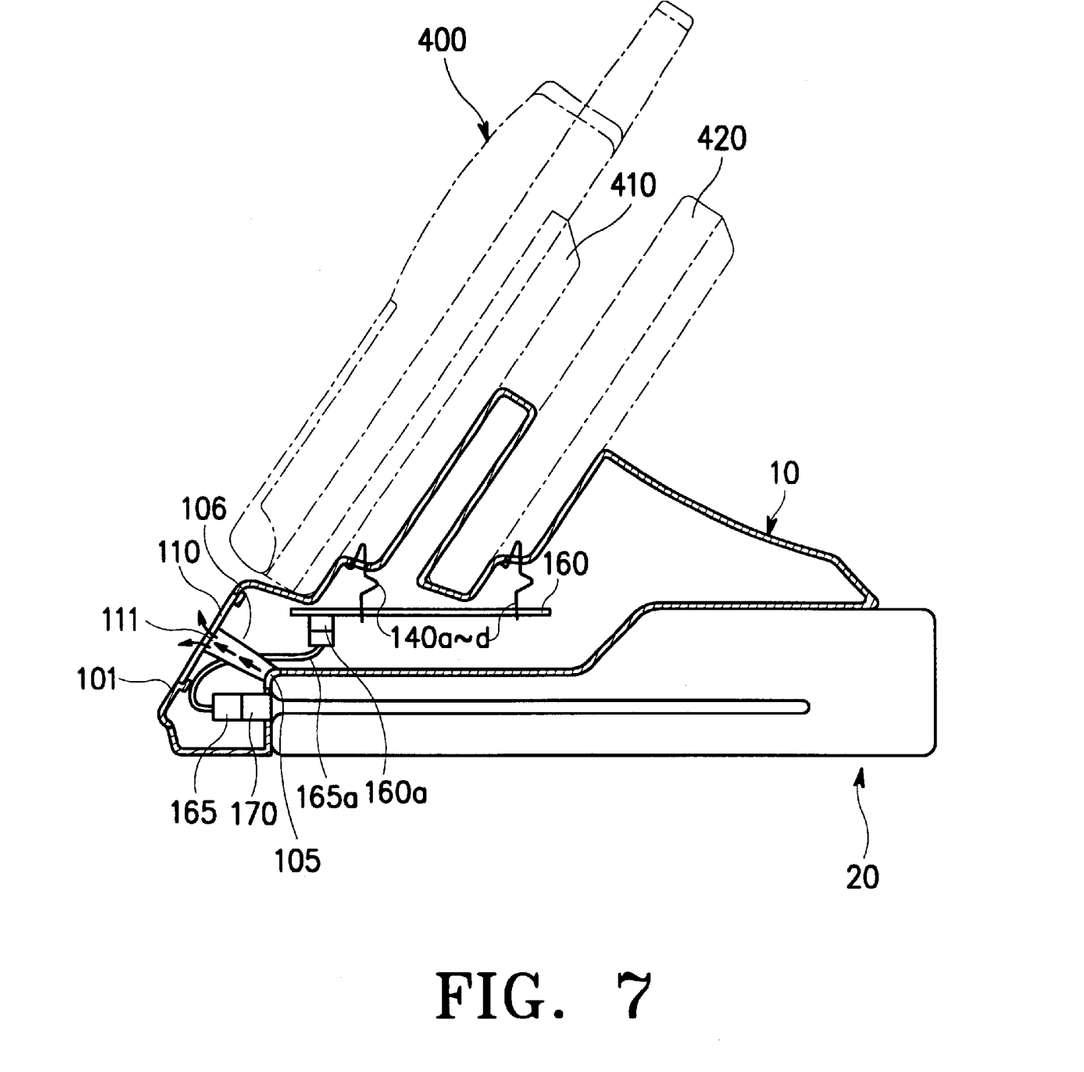
FIG. 7 is a cross sectional view of the portable battery charger of FIG. 1 illustrating the charging of both a battery pack mounted on a mobile station and a separate battery.
Figure 8:
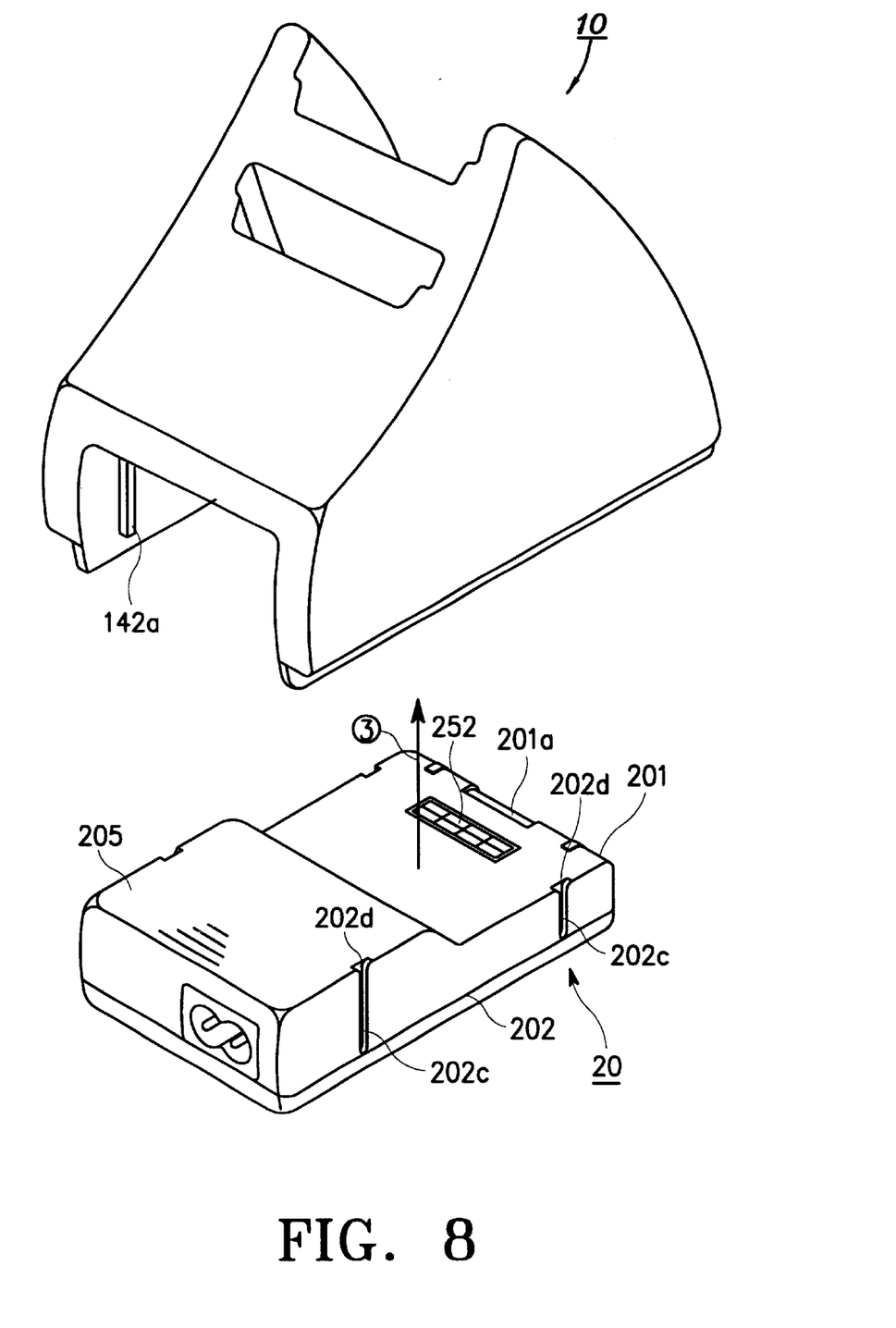
FIG. 8 is an exploded and perspective view illustrating a portable battery charger according to another embodiment of the present invention.

FIG. 7 shows that the mobile station 400 attached with the battery pack 410 is mounted in the charger housing 10, electrically connected to the charging unit 20. The charger housing 10 includes a printed circuit board 160 provided with a plurality of electrical contacts 140*a* to 140*d* and an interface connector 160*a*. In the present invention, it should be noted that the electrical contacts are arranged in the charger housing rather than as part of the charging unit. This makes it possible to independently use the charging unit for charging a portable electronic device during a journey.

The interface connector 250 of the charging unit 20 is connected to a first connector 170 provided in the charger housing 10, which in turn is connected to the interface connector 160*a* provided in the printed circuit board through a connection device 165 with a flat-type cable 165*a*. The first connector 170 is horizontally attached to the charger housing 10. Meanwhile, the connector 160*a* is vertically mounted in the printed circuit board 160. Thus, when the charging unit 20 is mounted in the charger housing 10, the connector 160*a* is electrically connected through the electrical contacts to the mobile station attached with a battery pack 410 or a separate battery pack 420. In this case, the light emitting diodes of the charging unit 20 transmit light to the transparent window 110 to display the charging state of the battery pack. To this end, the charger housing 10 has at least one aperture 105 to provide a light passage from the light emitting diode through the lens 106 to the transparent window 110.

In another embodiment as shown in FIGS. 8 to 11, the charging unit 20 is vertically inserted into the charger housing 10. The other points are virtually the same as those of the previous embodiment. In other embodiments of the present invention, the charging unit 20 may be mounted into the charger housing 10 at any angle between the horizontal and the vertical. In the present embodiment, the guide structure for vertically mounting the charging unit 20 in the charger housing 10 comprises a pair of vertical guide grooves 202*c* respectively formed in both side surfaces of the charging unit, an inlet opening 202*d* formed in the upper end of each vertical guide groove, and a vertical guide rib 142a formed on each of the inside walls of the charger housing so positioned to be inserted in the corresponding vertical guide groove 202c. In addition, the charging unit has the interface connector 252 arranged in its upper surface 205, and a locker slot 201a formed in its leading edge to receive the locker of the charger housing.

Figure 9:
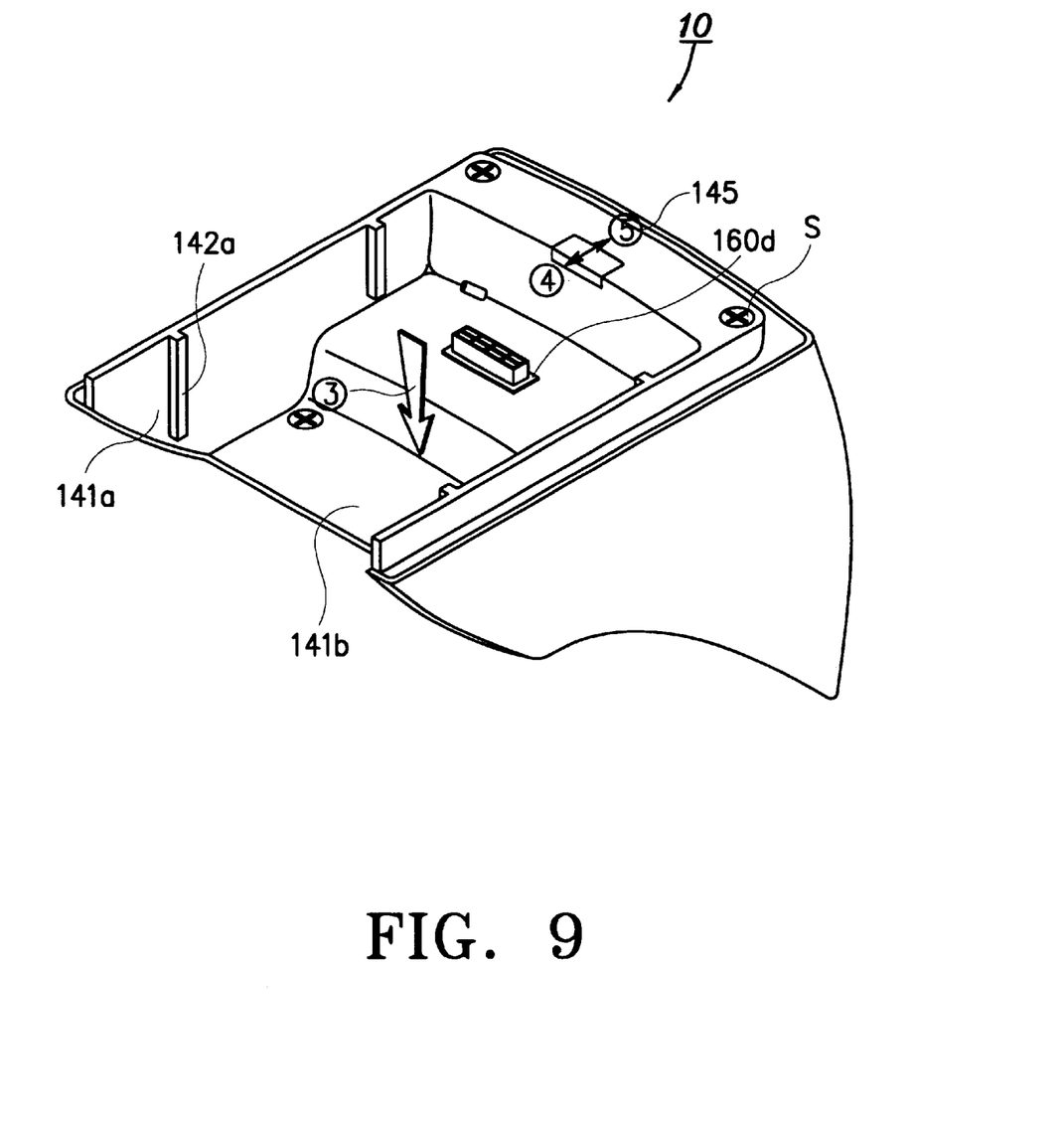
FIG. 9 a perspective view for illustrating the lower part of the battery charger of FIG. 8.
Figure 10:
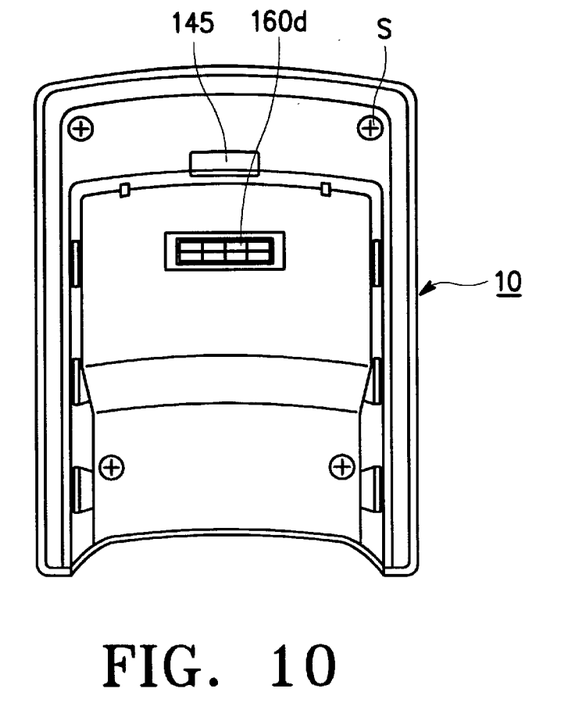
FIG. 10 is a plane view of FIG. 9.
Figure 11:
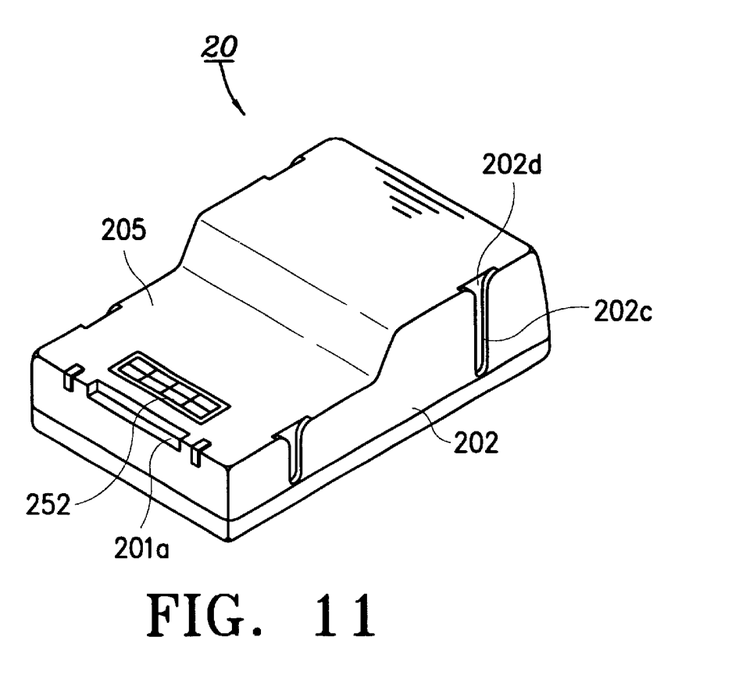
FIG. 11 is a perspective view for illustrating a charging unit of the portable battery charger of FIG. 8.

Referring to FIG. 9, the charger housing 10 has the interface connector 160d projected from the ceiling 141b, and a locker 145 arranged below the interface connector 160d. The locker 145 is designed to resiliently move sidewise in the direction of arrows ④ and ⑤ to lock or release the charging unit 20 with or from the charger housing 10.

Figure 12:
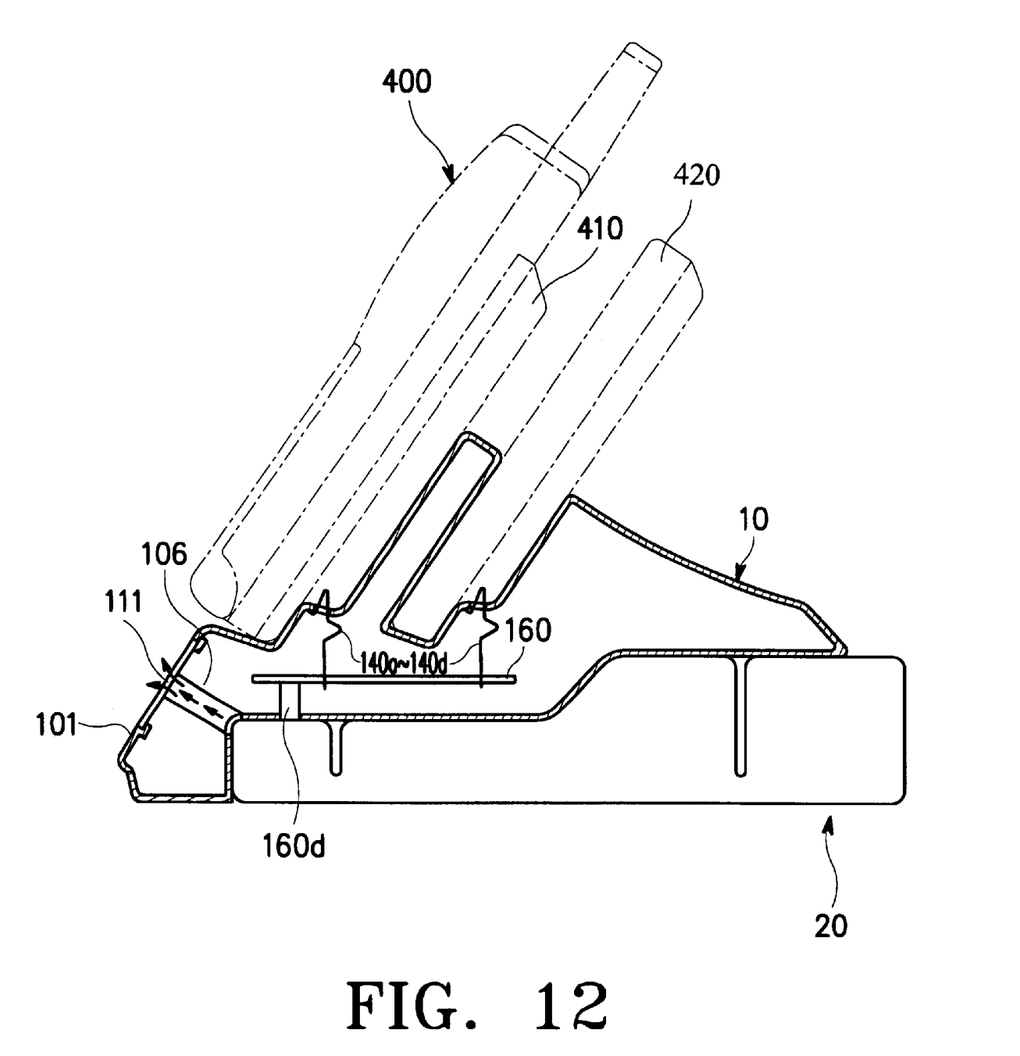
FIG. 12 is a cross sectional view of the portable battery charger of FIG. 8 illustrating the charging of both a battery pack mounted on a mobile station and a separate battery.

Referring to FIG. 12, in order to electrically connect the charger housing 10 and charging unit 20, the charger housing 10 has a printed circuit board 160 provided with a plurality of electrical contacts 140a to 140d and an interface connector 160d. The electrical contacts 140a to 140d are positioned to mate with the electrical contacts of the mobile station 400 attached with a battery pack 410 or a separate battery pack 420. The interface connector 160d is vertically arranged beneath the printed circuit board 160 to connect with the interface connector 252 of the charging unit. Thus, when mounting the charging unit 20 in the charger housing 10, the interface connector 252 of the charging unit 20 is connected to the interface connector 160d of the printed circuit board, so that the charging unit may charge the battery pack 410 or 420.

Figure 13B:
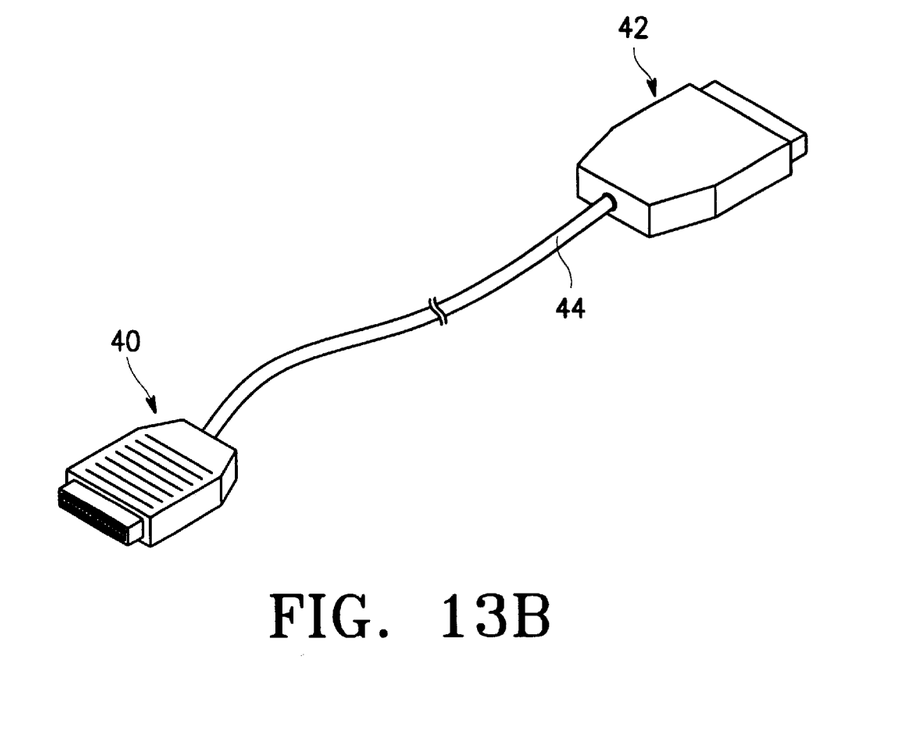

The electrical connection device shown in FIG. 13A is to connect the charging unit to a power supply of a wall, consisting of a first and a second connector 30 and 32 and a cord 34 connecting them. The first connector 30 is shaped having the same form as that used in the electrical shaver. The battery pack mounted in the housing is charged through the charging unit connected through the first connector 30 to the second connector 32 to the power supply of the wall. Meanwhile, the interface connection device as shown in FIG. 13B is to connect the charging unit to the mobile station, consisting of two interface connectors 40 and 42 and a cord 44 connecting them. One connector 40 is connected to the interface connector of the mobile station, and the other 42 to the interface connector of the charging unit.

Figure 14A:
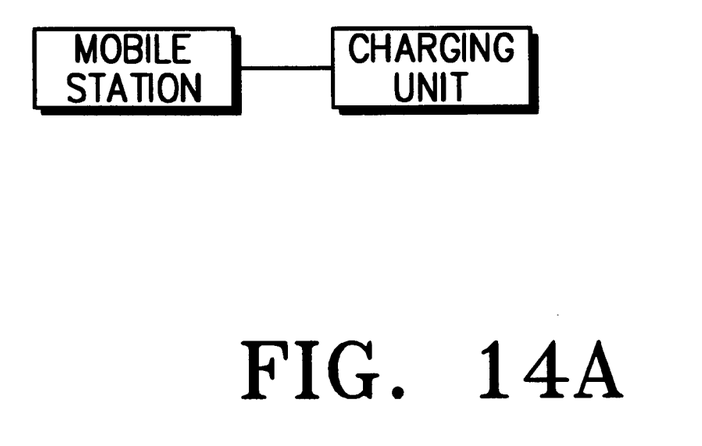
FIGS. 14A to 14D are block diagrams illustrating various examples of charging a battery pack by means of the inventive charging unit.
Figure 14B:
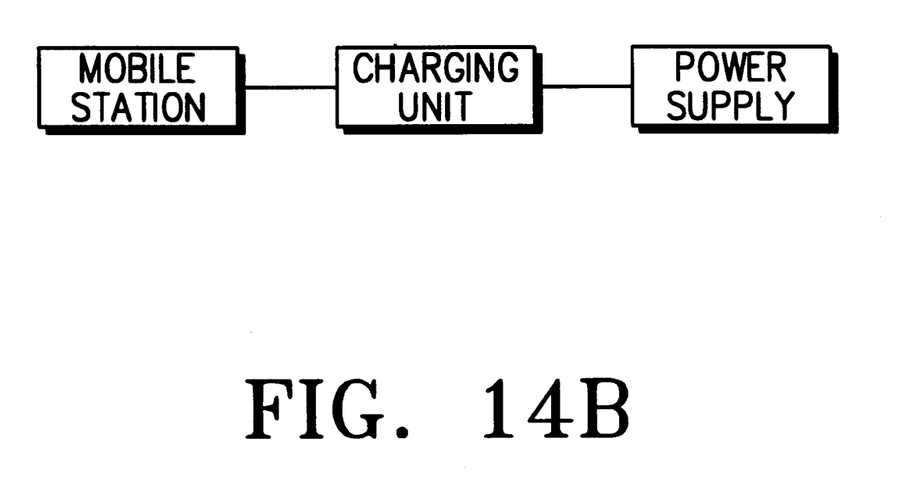
Figure 14C:
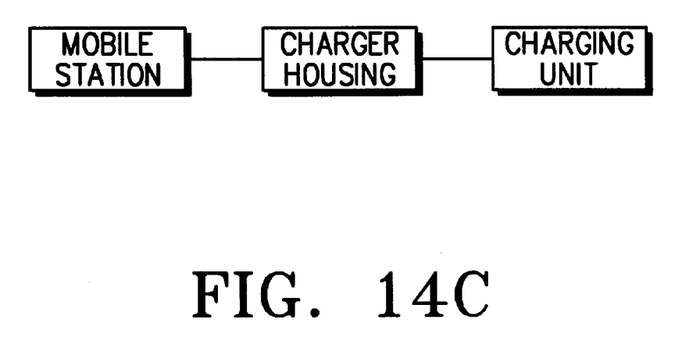
Figure 14D:
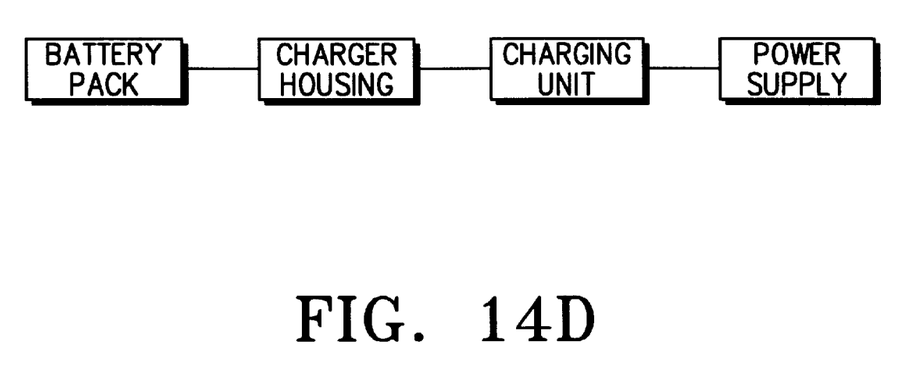

Hereinafter is described the way of using the inventive battery charger in connection with FIGS. 14A to 14D. First, as shown in FIG. 14A, when the charging unit is fully charged, the interface connection device shown in FIG. 13B is used to connect the charging unit to the mobile station to charge it. Second, as shown in FIG. 14B, when the charging unit is not fully charged, the electrical connection device shown in FIG. 13A is used to connect the charging unit to the power supply while the interface connection device shown in FIG. 13B is used to connect the charging unit to the mobile station, so that the battery pack mounted on the mobile station is charged by the charging unit. Third, as shown in FIG. 14C, when the mobile station attached with a battery pack and a separate battery pack are mounted in the charger housing, and the charging unit is fully charged and inserted into the charger housing, the batteries are charged by the charging unit. In this case, the charging unit and mobile station are connected through the electrical contacts of the charger housing while the charger housing and charging unit are connected through the interface connectors. Fourth, as shown in FIG. 14D, when the mobile station attached with a battery pack and a separate battery pack are mounted in the charger housing, and the charging unit is not fully charged and inserted into the charger housing, the batteries and charger housing are connected through the electrical contacts of the charger housing, the charger housing and charging unit through the interface connectors, and the charging unit and power supply through the electrical connection device shown in FIG. 13A.

As described above, the invention provides a versatile battery charger that may readily accommodate varieties of battery packs and enable the user to readily charge the battery pack during a journey without adding considerable expense to obtain a new charger. While the present invention has been described in connection with specific embodiments accompanied by the attached drawings, it will be readily apparent to those skilled in the art that various changes and modifications may be made thereto without departing the gist of the present invention.

What is claimed is:

1. A portable battery charger having at least one charging receptacle to accept at least one of a battery pack mounted on a mobile station and a separate battery pack, comprising:
   a charger housing including a pair of inside walls facing each other, a ceiling connecting said inside walls, at least one opening side, a mounting space enclosed by said inside walls and ceiling, and a printed circuit board providing at least one pair of electrical contacts;
   a charging unit having a front surface, a rear surface, a pair of side surfaces, and at least one top surface detachably mounted in said mounting space;
   a guide structure for horizontally mounting said charging unit in said charger housing; and
   an electrical connection device for electrically connecting said charging unit with said charger housing.

2. A portable battery charger as defined in claim 1, wherein said mounting space is formed in the lower part of said charger housing.

3. A portable battery charger as defined in claim 1, wherein said mounting space consists of a first sub-space with a higher ceiling part and a second sub-space with a lower ceiling part so as to form a step.

4. A portable battery charger as defined in claim 1, wherein said charger housing has a locking device consisting of a locker provided with a hook, said locker being arranged so as to move upwardly and downwardly.

5. A portable battery charger as defined in claim 1, wherein said charger housing has a front end and a transparent window mounted on the front end to include at least one lens.

6. A portable battery charger as defined in claim 5, wherein said lens is extended towards said mounting space.

7. A portable battery charger as defined in claim 1, wherein said charging unit is provided with at least one charging indication light to indicate the state of the charging of said battery pack.

8. A portable battery charger as defined in claim 7, wherein said charging indication light is positioned in a leading edge of said charging unit.

9. A portable battery charger as defined in claim 1, wherein said electrical connection device includes a first interface connector provided in the front surface of said charging unit, a second interface connector fixedly arranged in said charger housing, a third interface connector provided in said printed circuit board, and a connection member for electrically connecting said second and third interface connectors.

10. A portable battery charger as defined in claim 1, wherein said charger housing has at least one aperture for passing light.

11. A portable battery charger as defined in claim 1, wherein said charging unit has a lock slot provided in the front surface.

12. A portable battery charger as defined in claim 1, wherein said guide structure comprises a pair of horizontal guide grooves respectively formed in said pair of side surfaces of said charging unit, an inlet opening formed in the rear end of each horizontal guide groove, and at least one horizontal guide rib formed on each of said inside walls of said charger housing so as to be inserted in the corresponding horizontal guide groove.

13. A portable battery charger having at least one charging receptacle to accept at least one of a battery pack mounted on a mobile station and a separate battery pack, comprising:

- a charger housing including a pair of inside walls facing each other, a ceiling connecting said inside walls, at least one opening side, a mounting space enclosed by said inside walls and ceiling, and a printed circuit board providing at least one pair of electrical contacts;
- a charging unit having a front surface, a rear surface, a pair of side surfaces, and at least one top surface, detachably mounted in said mounting space;
- a guide structure for vertically mounting said charging unit in said charger housing; and
- an electrical connection device for electrically connecting said charging unit with said charger housing.

14. A portable battery charger as defined in claim 13, wherein said electrical connection device includes a first interface connector provided in the at least one top surface of said charging unit, and a second interface connector provided in said printed circuit board so as to be directly connected with said first interface connector.

15. A portable battery charger as defined in claim 13, wherein said guide structure comprises a pair of vertical guide grooves respectively formed in said pair of side surfaces of said charging unit, an inlet opening formed in the upper end of each vertical guide groove, and at least one vertical guide rib formed on each of said inside walls of said charger housing so as to be inserted in the corresponding vertical guide groove.

16. A portable battery charger as defined in claim 13, wherein said charger housing has a locking device arranged so as to move horizontally.

17. A portable battery charger as defined in claim 13, wherein said charging unit has a locking slot formed in the front surface.

18. A portable battery charger having at least one charging receptacle designed to accept at least one of a battery pack mounted on a mobile station and a separate battery pack, comprising:

- a charger housing including a pair of inside walls facing each other, a ceiling connecting said inside walls, at least one opening side, a mounting space enclosed by said inside walls and ceiling, and a printed circuit board providing at least one pair of electrical contacts;
- a charging unit having a front surface, a rear surface, a pair of side surfaces, and at least one top surface detachably mounted in said mounting space;
- a guide structure for mounting said charging unit in said charger housing; and
- an electrical connection device for electrically connecting said charging unit with said electrical contacts.

19. A portable battery charger as defined in claim 18, wherein said guide structure comprises a pair of guide grooves respectively formed in said pair of side surfaces of said charging unit, an inlet opening formed in the end of each guide groove, and at least one guide rib formed on each of said inside walls of said charger housing so as to be inserted in the corresponding guide groove.

20. A portable battery charger as defined in claim 18, wherein said electrical connection device includes a first interface connector provided in said charging unit, a second interface connector fixedly arranged in said charger housing so designed to mate with said first interface connector, a third interface connector provided in said printed circuit board, and a connection member for electrically connecting said second and third interface connectors.

\* \* \* \* \*